(12) United States Patent
Fan et al.

(10) Patent No.: US 8,208,261 B2
(45) Date of Patent: Jun. 26, 2012

(54) ELECTRONIC DEVICE WITH POWER SUPPLY

(75) Inventors: Chen-Lu Fan, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 414 days.

(21) Appl. No.: 12/550,804

(22) Filed: Aug. 31, 2009

(65) Prior Publication Data

US 2010/0309611 A1 Dec. 9, 2010

(30) Foreign Application Priority Data

Jun. 4, 2009 (CN) .......................... 2009 1 0302919

(51) Int. Cl.
*H05K 7/00* (2006.01)
(52) U.S. Cl. .................. 361/727; 361/679.58; 361/610; 312/223.1; 312/223.2
(58) Field of Classification Search ............. 361/679.58, 361/610
See application file for complete search history.

(56) References Cited

U.S. PATENT DOCUMENTS

| | | | | |
|---|---|---|---|---|
| 5,136,468 A | * | 8/1992 | Wong et al. | 361/679.6 |
| 5,214,567 A | * | 5/1993 | Feightner et al. | 361/679.32 |
| 5,761,045 A | * | 6/1998 | Olson et al. | 361/726 |
| 5,777,848 A | * | 7/1998 | McAnally et al. | 361/725 |
| 5,790,372 A | * | 8/1998 | Dewey et al. | 361/679.58 |
| 6,337,793 B1 | * | 1/2002 | Vier et al. | 361/679.57 |
| 6,667,887 B2 | * | 12/2003 | Sim et al. | 361/725 |
| 7,057,898 B2 | * | 6/2006 | Chen et al. | 361/725 |
| 7,088,587 B2 | * | 8/2006 | Chen et al. | 361/724 |
| 7,400,508 B2 | * | 7/2008 | Erickson et al. | 361/726 |
| 7,450,383 B1 | * | 11/2008 | Li et al. | 361/695 |
| 7,602,612 B2 | * | 10/2009 | Li | 361/747 |
| 7,688,576 B2 | * | 3/2010 | Kim et al. | 361/679.33 |
| 7,715,177 B2 | * | 5/2010 | Chen et al. | 361/679.01 |
| 2002/0172014 A1 | * | 11/2002 | Lung | 361/725 |
| 2003/0011976 A1 | * | 1/2003 | Treiber et al. | 361/683 |
| 2003/0193782 A1 | * | 10/2003 | Chen | 361/726 |
| 2008/0266817 A1 | * | 10/2008 | Li | 361/747 |
| 2009/0073651 A1 | * | 3/2009 | Hu et al. | 361/679.58 |

* cited by examiner

*Primary Examiner* — Anthony Q Edwards
(74) *Attorney, Agent, or Firm* — Altis Law Group, Inc.

(57) ABSTRACT

An electronic device includes a chassis, a power supply, and a bracket. The power supply is capable of supplying power to electronic elements secured in the chassis. A resiliently deformable latch piece is located on the power supply. A tab is located on the latch piece. The bracket is secured in the chassis and defines a slit. The slit receives the tab of the power supply so as to secure the power supply in the bracket, and the latch piece is resiliently deformable to disengage the tab from the slit to remove the power supply from the bracket.

13 Claims, 4 Drawing Sheets

ELECTRONIC DEVICE WITH POWER SUPPLY

BACKGROUND

1. Technical Field

The present disclosure relates to electronic devices, and particularly to an electronic device with a power supply.

2. Description of Related Art

A power supply is often needed to supply power to an electronic device, such as a desktop computer, a notebook computer, a computer server, and so on. However, the power supply is usually mounted in the electronic device with screws, which is a very inconvenient and time-consuming process.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
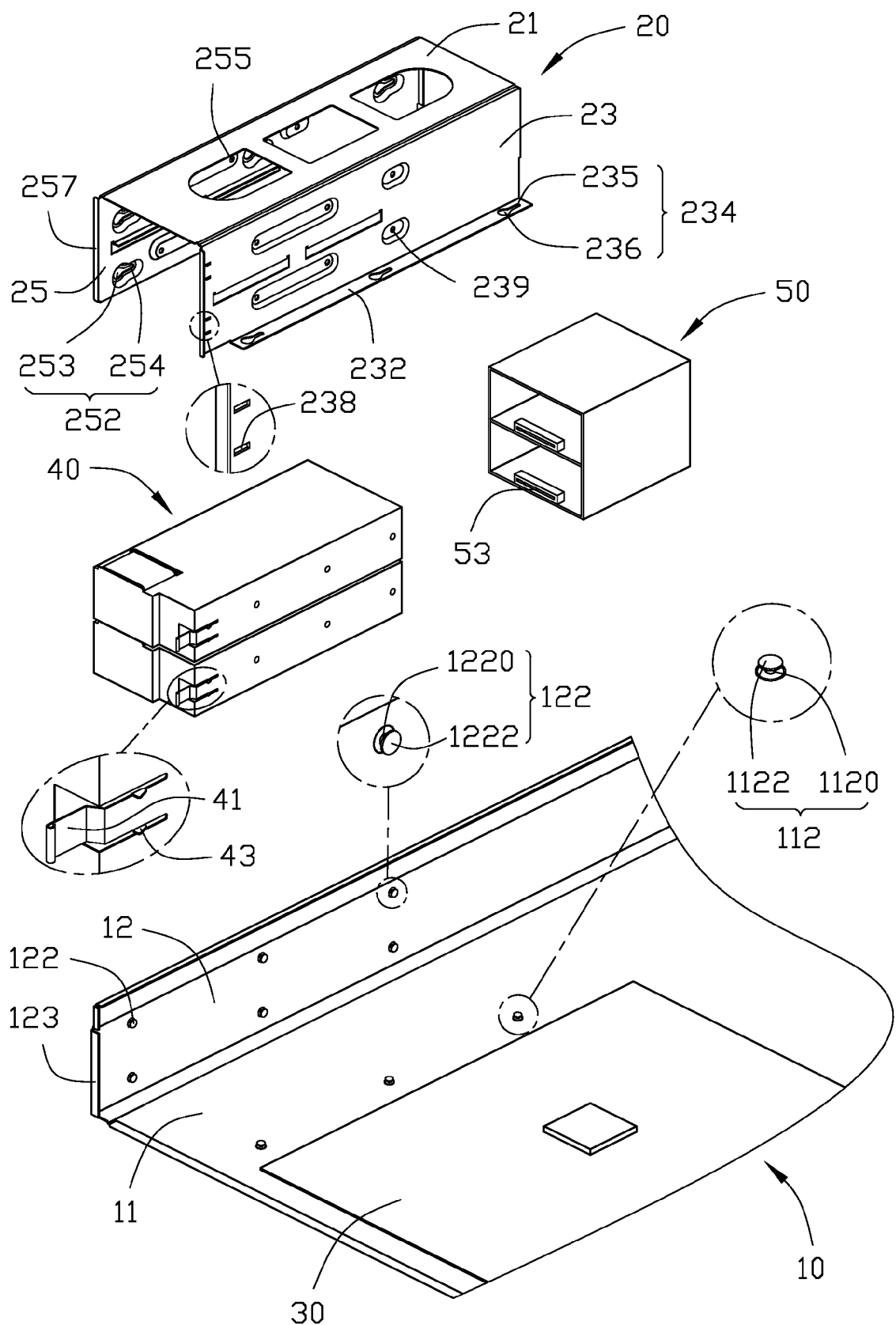
FIG. 1 is an isometric, exploded view of an electronic device, in accordance with an embodiment.

Referring to FIG. 1, an electronic device in accordance with an embodiment includes a chassis 10, a bracket 20 configured to be secured in the chassis 10, and a power supply 40 configured to be secured in the bracket 20.

The chassis 10 includes a bottom plate 11 and a side plate 12 perpendicular to the bottom plate 11. A motherboard 30 is secured in the chassis 10 on the bottom plate 11. A plurality of positioning posts 112 are located on the bottom plate 11 beside the motherboard 30, and arranged in one line. Each positioning post 112 includes a positioning head portion 1122, and a positioning neck portion 1120 having a diameter smaller than a diameter of the positioning head portion 1122. A plurality of securing posts 122 are located on the side plate 12. Each securing post 122 includes a securing head portion 1222 and a securing neck portion 1220 having a diameter smaller than a diameter of the securing head portion 1222. The securing posts 122 are arranged in two horizontal lines. A side plate flange 123 is bent perpendicularly from a front edge of the side plate 12.

The bracket 20 includes a top wall 21, and first and second sidewalls 23, 25 bent perpendicularly down from opposite edges of the top wall 21. A first sidewall flange 232 is bent perpendicularly out from a bottom edge of the first sidewall 23. A plurality of positioning holes 234 are defined in the first sidewall flange 232 for receiving the positioning posts 112 of the chassis 10. Each positioning hole 234 includes a circular positioning entry 235 and an elongated positioning slot 236 communicating with the positioning entry 235. The positioning entry 235 has a diameter greater than the diameter of the positioning head portion 1122 of the positioning post 112. The positioning slot 236 has a width smaller than the diameter of the positioning head portion 1122 of the positioning post 112, but greater than the diameter of the positioning neck portion 1120 of the positioning post 112. Two pairs of slits 238 are defined in the first sidewall 23 adjacent a front edge thereof, and arranged in a vertical line. A plurality of fixing holes 239 are defined in the first side wall 23, and arranged in two horizontal lines.

A plurality of securing holes 252 are defined in the second sidewall 25 for receiving the securing posts 122 of the chassis 10, and arranged in two horizontal lines. Each securing hole 252 includes a circular securing entry 253, and an elongated securing slot 254 communicating with the securing entry 253. The securing entry 253 has a diameter greater than the diameter of the securing head portion 1222 of the securing post 122. The securing slot 254 has a width smaller than the diameter of the securing head portion 1222, but greater than the diameter of the securing neck portion 1220. A plurality of mounting holes 255 are defined in the second sidewall 25, and arranged in two horizontal lines. A second sidewall flange 257 is perpendicularly bent from a front edge of the second sidewall 25 of the bracket 20, and perpendicular to the first sidewall flange 232.

The power supply 40 is shorter than the bracket 20. A resilient latch piece 41 is located on a side of the power supply 40. A pair of tabs 43 are located on the latch piece 41 configured for engaging in the corresponding pair of slits 238 of the first sidewall 23 of the bracket 20.

A connecting body 50 is configured to be secured in the bracket 21. The connecting body 50 has two sockets 53 capable of electrically coupling with connectors (not shown) on rear walls of the power supply 40, so that the power supply 40 can be electrically coupled to electronic elements, like the motherboard 30 secured in the chassis 10, through the connecting body 50.

Figure 2:
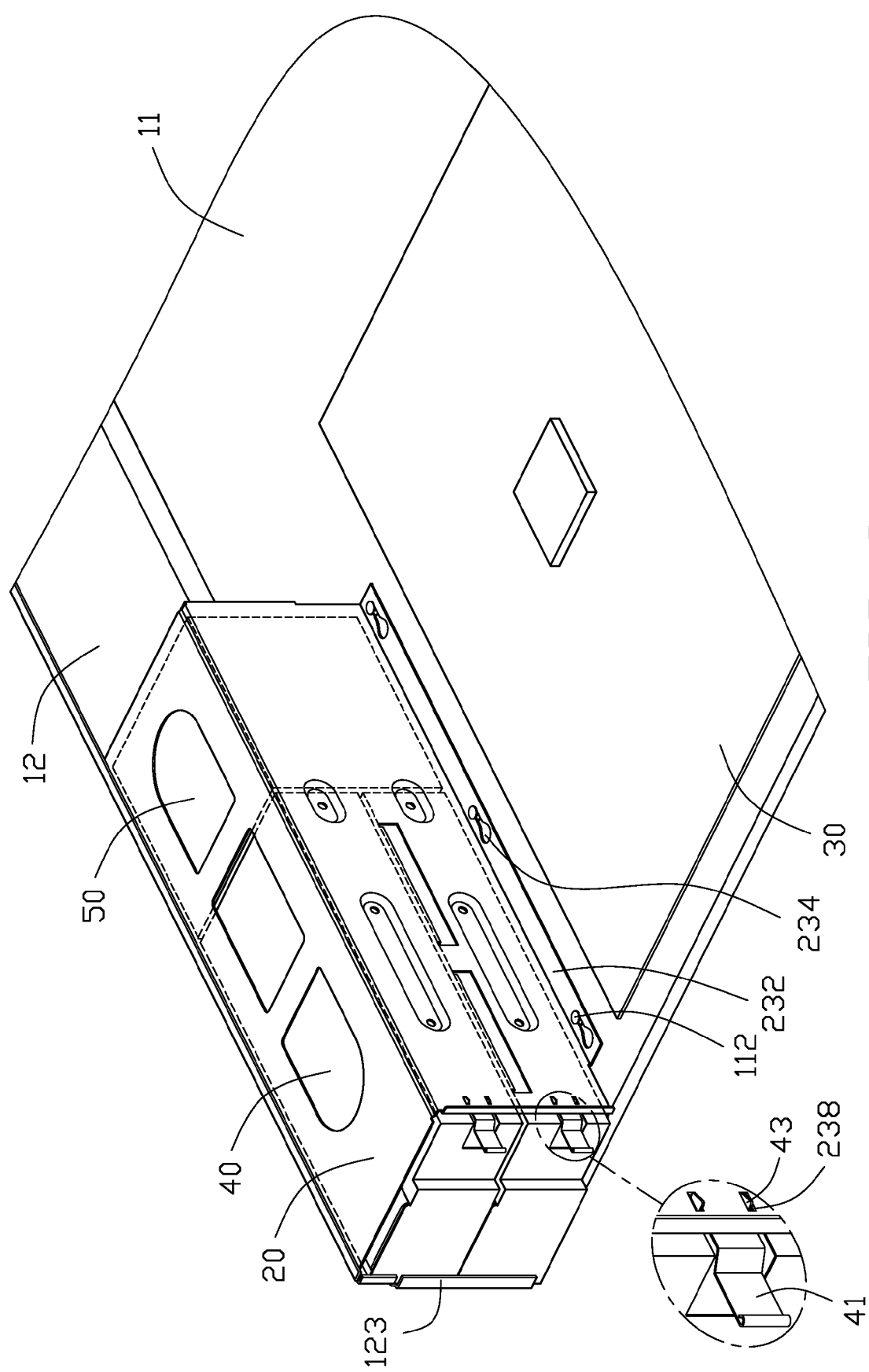
FIG. 2 is an assembled view of FIG. 1.

Referring also to FIG. 2, in assembly of the power supply 40, the power supply 40 is coupled to the connecting body 50 with connections between the power supply connectors and the corresponding sockets 53. The power supply 40 and the connecting body 50 are then together inserted in the bracket 20. When the tabs 43 of the latch pieces 41 are pressed by the front edge of the first sidewall 23, the latch pieces 41 are resiliently deformed. The power supply 40 and the connecting body 50 are further pushed to be inserted in the bracket 20. When the tabs 43 align with the corresponding slits 238 of the first sidewall 23, the latch pieces 41 rebound to engage the tabs 43 in the slits 238. The power supply 40 and the connecting body 50 are thus secured in the bracket 20.

The power supply 40, the connecting body 50, and the bracket 20 are together placed in the chassis 10. The positioning posts 112 are engaged in the corresponding positioning entry 236 of the positioning holes 234, and the securing posts 122 are inserted in the corresponding securing entry 253 of the securing hole 252. The bracket 20 is pushed to slide on the bottom plate 31 in a direction towards the side plate flange 123. Until the power supply 40 abuts against the side plate flange 123, the positioning neck portions 1120 of the positioning posts 112 are slid in the positioning slots 236 of the positioning holes 234, and the securing neck portions 1120 of the securing posts 112 are slid in the securing slots 253 of the securing holes 252, respectively. A first fastener (not shown) is screwed into the first sidewall flange 232 and the bottom pate 11 to prevent the positioning posts 112 and the securing posts 122 from removing from the positioning holes 234 and the securing holes 252. The bracket 20, the power supply 40, and the connecting body 50 are thus secured in the chassis 10.

In disassembly of the power supply 40, the first fastener is removed from the bracket 20 and the bottom plate 11. The bracket 20 can be then be slid away from the side plate flange 123. The positioning neck portions 1120 of the positioning posts 112 and the securing neck portions 1220 of the securing posts 122 are slid to the positioning entries 236 of the positioning holes 234 and the securing entries 253 of the securing holes 252, respectively. The bracket 20, the power supply 40, and the connecting body 50 can then be removed from the chassis 10. The latch pieces 41 are operated to resiliently deform until the tabs 43 disengage from the slits 238 of the bracket 20. The power supply 40 together with the connecting body 50 can then be removed from the bracket 20.

Figure 3:
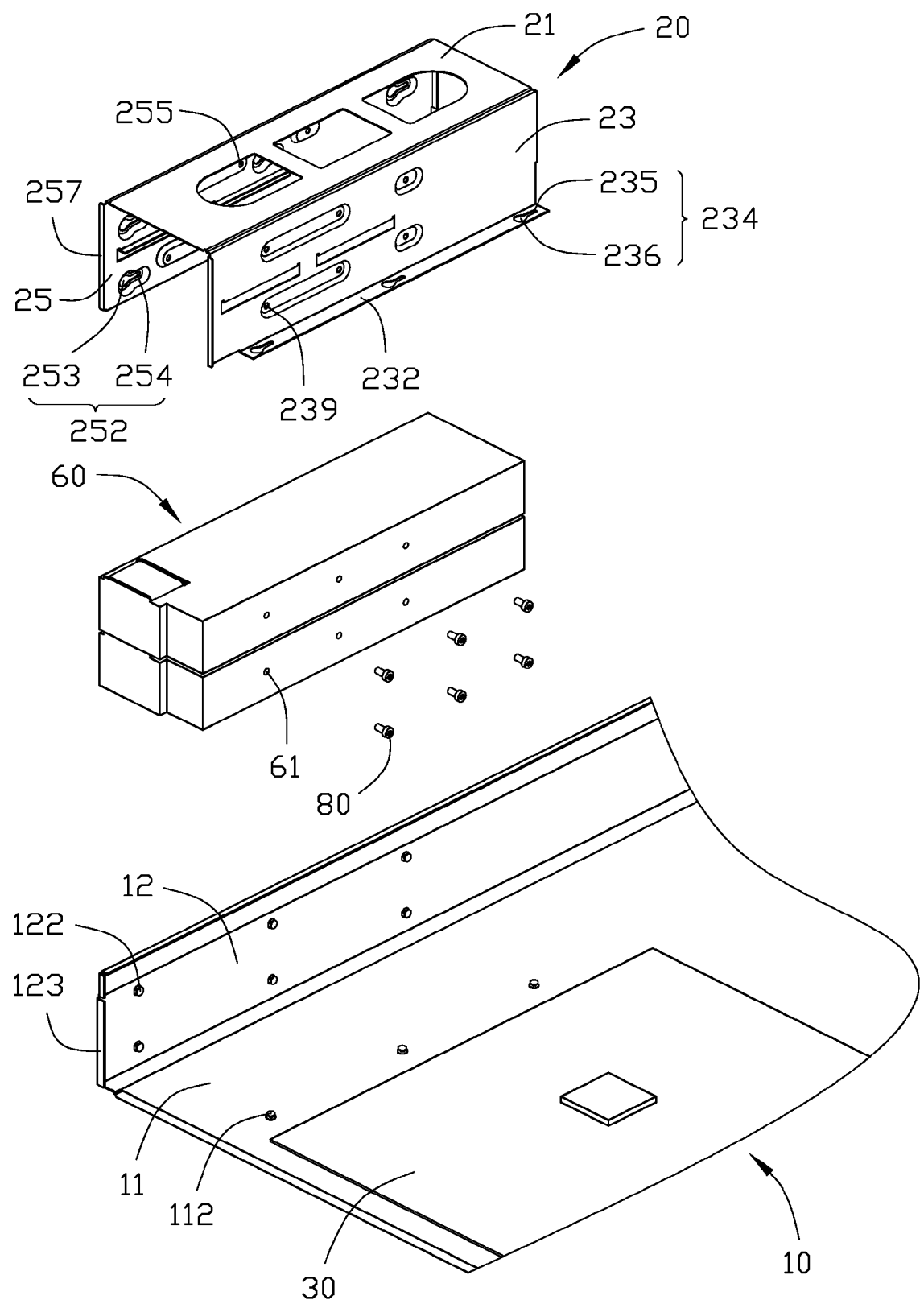
FIG. 3 is an isometric, exploded view of an electronic device, in accordance with an alternative embodiment.
Figure 4:
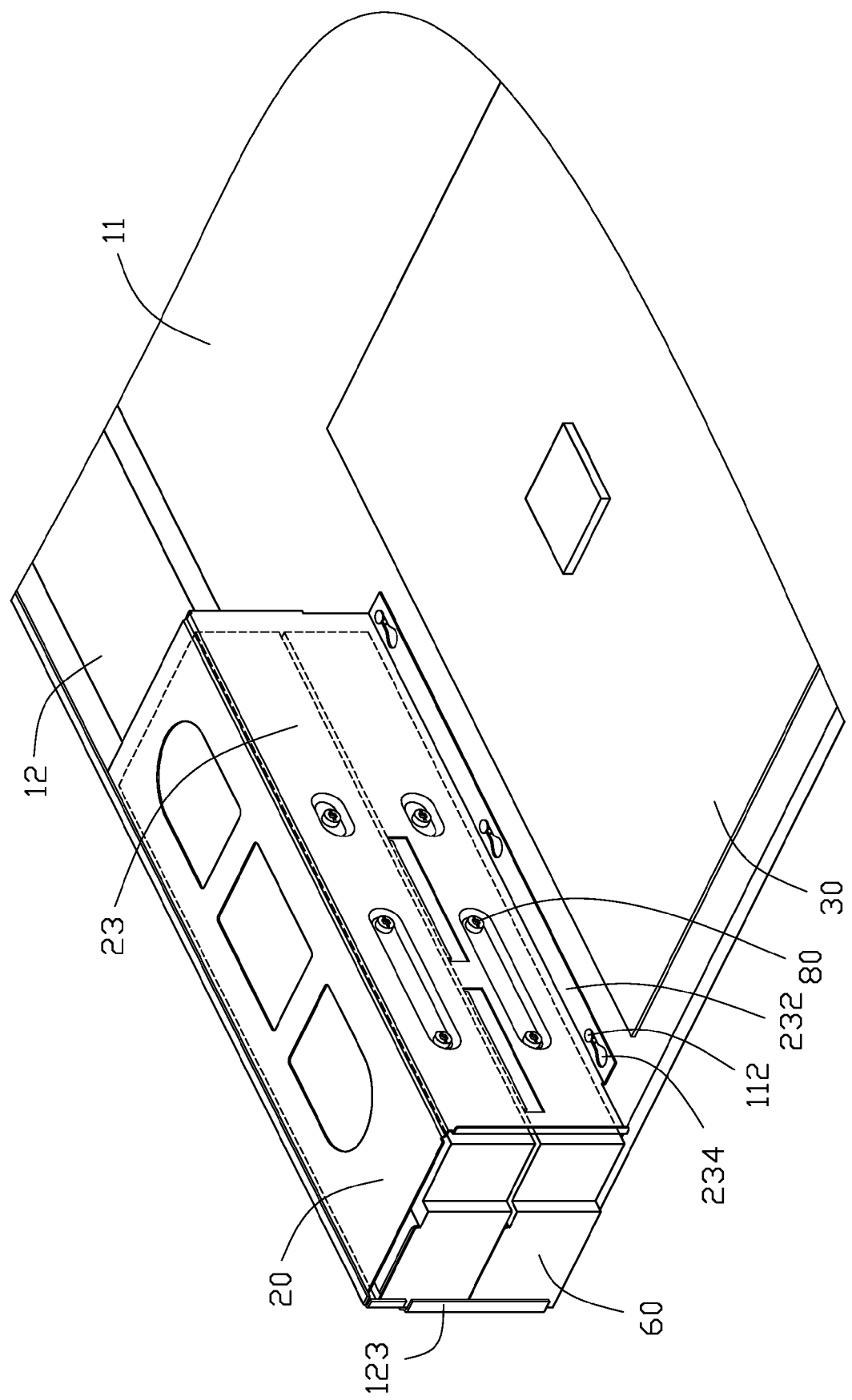
FIG. 4 is an assembled view of FIG. 3.

Referring to FIGS. 3-4, two power supplies 60 in accordance with an alternative embodiment define a plurality of locking holes 61 corresponding to the fixing holes 239 of the bracket 20. Each power supply 60 has a length generally equal to the length of the bracket 20.

The procedure of assembly and disassembly of the power supplies 60 are the same as with the power supply 40, except that the power supplies 60 are secured in the bracket 20 with a plurality of second fasteners 80 engaging correspondingly in the locking holes 61 and the fixing holes 239.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a chassis comprising a bottom plate and a side plate perpendicular to the bottom plate;
a power supply capable of supplying power to electronic elements secured in the chassis, a resiliently deformable latch piece being located on the power supply, a tab being located on the latch piece; and
a bracket secured in the chassis on the bottom plate and defining a slit, the bracket comprising a first sidewall and a second sidewall parallel to the side plate; wherein
the slit receives the tab so as to secure the power supply in the bracket between the first sidewall and the second sidewall, and the latch piece is resiliently deformable to disengage the tab from the slit to remove the power supply from the bracket; and
a side plate flange is bent from the side plate of the chassis; a second sidewall flange is bent from the second sidewall of the bracket; the side plate flange is engageable with the second sidewall flange to prevent the bracket from moving out of the chassis.

2. The electronic device of claim 1, wherein a first sidewall flange is perpendicularly bent from the first sidewall of the bracket; the first sidewall flange defines a positioning hole; a positioning post is located on the bottom plate of the chassis and engages in the positioning hole of the first sidewall flange.

3. The electronic device of claim 2, wherein the positioning post comprises a positioning head portion and a positioning neck portion with a diameter smaller than a diameter of the positioning head portion; the positioning hole further comprising a circular positioning entry and an elongated positioning slot communicating with the positioning entry; the positioning entry has a diameter greater than the diameter of the poisoning head portion; the positioning slot has a width greater than the diameter of the positioning neck portion, but smaller than the diameter of the positioning head portion.

4. The electronic device of claim 1, wherein the second sidewall defines a securing hole; a securing post is located on the side plate of the chassis and engages in the securing hole of the second sidewall.

5. The electronic device of claim 4, wherein the securing post comprises a securing head portion and a securing neck portion with a diameter smaller than a diameter of the securing head portion; the securing hole further comprising a circular securing entry and an elongated securing slot communicating with the securing entry; the securing entry has a diameter greater than the diameter of the poisoning head portion; the securing slot has a width greater than the diameter of the securing neck portion, but smaller than the diameter of the securing head portion.

6. The electronic device of claim 1, wherein a connecting body is electrically coupled to the power supply, and engagable in the bracket when the power supply has a length smaller than a length of the bracket; the power supply is capable of supplying power to the electronic element through the connecting body.

7. An electronic device comprising:
a chassis comprising a bottom plate and a side plate perpendicular to the bottom plate;
a power supply capable of supplying power to electronic elements secured in the chassis; and
a bracket secured in the chassis on the bottom plate, the bracket comprising a first sidewall and a second sidewall parallel to the side plate; wherein
the power supply is received in the bracket between the first sidewall and the second sidewall before the bracket is secured in the chassis; and
a side plate flange is bent from the side plate of the chassis; a second sidewall flange is bent from the second sidewall of the bracket; the side plate flange is engageable with the second sidewall flange to prevent the bracket from moving out of the chassis.

8. The electronic device of claim 7, wherein a first sidewall flange is perpendicularly bent from the first sidewall of the bracket; the first sidewall flange defines a positioning hole; a positioning post is located on the bottom plate of the chassis and engages in the positioning hole of the first sidewall flange.

9. The electronic device of claim 8, wherein the positioning post comprises a positioning head portion and a positioning neck portion with a diameter smaller than a diameter of the positioning head portion; the positioning hole further comprising a circular positioning entry and an elongated positioning slot communicating with the positioning entry; the positioning entry has a diameter greater than the diameter of the poisoning head portion; the positioning slot has a width greater than the diameter of the positioning neck portion, but smaller than the diameter of the positioning head portion.

10. The electronic device of claim 7, wherein the second sidewall defines a securing hole; a securing post is located on the side plate of the chassis and engages in the securing hole of the second sidewall.

11. The electronic device of claim 10, wherein the securing post comprises a securing head portion and a securing neck portion with a diameter smaller than a diameter of the securing head portion; the securing hole further comprising a circular securing entry and an elongated securing slot communicating with the securing entry; the securing entry has a diameter greater than the diameter of the poisoning head portion; the securing slot has a width greater than the diameter of the securing neck portion, but smaller than the diameter of the securing head portion.

12. The electronic device of claim 10, wherein a connecting body is electrically coupled to the power supply, and engagable in the bracket when the power supply has a length smaller than a length of the bracket; the power supply is capable of supplying power to the electronic element through the connecting body.

13. The electronic device of claim 7, wherein the first sidewall of the bracket defines a slit; a resiliently deformable latch piece with a tab is located on the power supply; the tab is engageable in the slit to secure the power supply in the bracket, and the latch piece is resiliently deformable to disengage from the tab from the slit to remove the power supply from the bracket.

* * * * *